US009538227B2

(12) United States Patent
Brandt et al.

(10) Patent No.: US 9,538,227 B2
(45) Date of Patent: *Jan. 3, 2017

(54) TECHNIQUES FOR CALL INTEGRATION WITH A TELEVISION SET-TOP BOX (STB)

(71) Applicant: AT&T Intellectual Property I, LP, Atlanta, GA (US)

(72) Inventors: Jeffrey L. Brandt, Cedar Park, TX (US); Marc Sullivan, Austin, TX (US); Les Bruce, Chicago, IL (US); Greg W. Edwards, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 287 days.

This patent is subject to a terminal disclaimer.

(21) Appl. No.: 14/255,574

(22) Filed: Apr. 17, 2014

(65) Prior Publication Data

US 2014/0230001 A1    Aug. 14, 2014

Related U.S. Application Data

(63) Continuation of application No. 11/651,092, filed on Jan. 6, 2007, now Pat. No. 8,745,680.

(51) Int. Cl.
| | |
|---|---|
| *H04N 7/16* | (2011.01) |
| *H04N 7/173* | (2011.01) |
| *H04N 21/41* | (2011.01) |
| *H04M 3/42* | (2006.01) |
| *H04N 21/478* | (2011.01) |
| *H04N 21/4788* | (2011.01) |
| *H04N 21/61* | (2011.01) |

(52) U.S. Cl.
CPC ..... *H04N 21/4126* (2013.01); *H04M 3/42195* (2013.01); *H04N 21/4104* (2013.01); *H04N 21/478* (2013.01); *H04N 21/4788* (2013.01); *H04N 21/6181* (2013.01); *H04N 21/6187* (2013.01); *H04M 3/42263* (2013.01); *H04M 2201/42* (2013.01); *H04M 2203/551* (2013.01); *H04M 2250/60* (2013.01)

(58) Field of Classification Search
None
See application file for complete search history.

(56) References Cited

U.S. PATENT DOCUMENTS

| | | | |
|---|---|---|---|
| 5,473,673 | A | 12/1995 | Van Wijk et al. |
| 5,570,295 | A | 10/1996 | Isenberg et al. |
| 6,021,119 | A | 2/2000 | Derks et al. |
| 6,396,907 | B1 | 5/2002 | Didcock |
| 6,760,415 | B2 * | 7/2004 | Beecroft ............. H04M 1/6033 348/E5.099 |
| 6,882,709 | B1 | 4/2005 | Sherlock |
| 6,917,610 | B1 | 7/2005 | Kung |
| 7,031,449 | B1 | 4/2006 | Lundy et al. |
| 7,088,805 | B1 | 8/2006 | Moore et al. |

(Continued)

*Primary Examiner* — Jonathan V Lewis
(74) *Attorney, Agent, or Firm* — Guntin & Gust, PLC; Atanu Das

(57) ABSTRACT

Techniques for call integration are provided. Call logs associated with multiple voice accounts are acquired and integrated as an integrated call log. The integrated call log is presented at a display. A user can take a variety of actions on the integrated call log as a whole or on individual entries within the integrated call log.

20 Claims, 6 Drawing Sheets

(56) References Cited

U.S. PATENT DOCUMENTS

| | | | |
|---|---|---|---|
| 7,145,998 B1* | 12/2006 | Holder | H04M 1/642 |
| | | | 379/210.01 |
| 7,221,748 B1* | 5/2007 | Moore | H04M 1/27455 |
| | | | 379/127.01 |
| 7,542,558 B2* | 6/2009 | Klein | H04M 3/42374 |
| | | | 379/201.01 |
| 7,839,987 B1* | 11/2010 | Kirchhoff | H04M 3/42195 |
| | | | 379/142.01 |
| 8,045,700 B2* | 10/2011 | Bruce | H04N 7/163 |
| | | | 379/265.01 |
| 2003/0043260 A1* | 3/2003 | Yap | G11B 20/10 |
| | | | 348/14.06 |
| 2004/0062383 A1* | 4/2004 | Sylvain | H04M 3/42195 |
| | | | 379/265.06 |
| 2004/0177376 A1* | 9/2004 | Caspi | H04N 7/18 |
| | | | 725/81 |
| 2004/0235520 A1* | 11/2004 | Cadiz | H04M 1/2473 |
| | | | 455/557 |
| 2005/0282582 A1* | 12/2005 | Slotznick | H04M 1/215 |
| | | | 455/557 |
| 2006/0002536 A1* | 1/2006 | Ambrose | H04M 1/56 |
| | | | 379/201.01 |
| 2006/0003743 A1 | 1/2006 | Moody et al. | |
| 2006/0031904 A1* | 2/2006 | Groff | H04M 1/006 |
| | | | 725/106 |
| 2006/0041916 A1 | 2/2006 | McQuaide | |
| 2006/0062205 A1 | 3/2006 | Doherty | |
| 2006/0256816 A1 | 11/2006 | Yarlagadda et al. | |
| 2007/0053653 A1* | 3/2007 | Huntington | H04N 5/76 |
| | | | 386/231 |
| 2007/0107019 A1* | 5/2007 | Romano | H04N 5/4401 |
| | | | 725/80 |
| 2007/0121584 A1* | 5/2007 | Qiu | H04M 3/42042 |
| | | | 370/352 |
| 2007/0201681 A1 | 8/2007 | Chen et al. | |
| 2007/0243858 A1 | 10/2007 | Marathe | |
| 2007/0263853 A1* | 11/2007 | Pearson | H04M 1/2745 |
| | | | 379/413.03 |
| 2008/0056463 A1 | 3/2008 | Lahtiranta | |
| 2008/0059627 A1 | 3/2008 | Hamalainen | |

* cited by examiner

TECHNIQUES FOR CALL INTEGRATION WITH A TELEVISION SET-TOP BOX (STB)

CROSS-REFERENCE TO RELATED APPLICATION(S)

This application is a continuation of U.S. patent application Ser. No. 11/651,092 filed Jan. 6, 2007 by Brandt et al., entitled "Techniques for Call Integration With a Television Set-Top Box (STB)." All sections of the aforementioned application(s) are incorporated herein by reference in its entirety.

FIELD OF THE DISCLOSURE

This application relates to voice and television (TV) technologies, and more specifically to techniques for call integration with a television set-top box (STB).

BACKGROUND

Consumers increasingly have a variety of communication and entertainment choices. For example, a typical consumer may have a landline and a mobile phone for voice communications and may have a television and a personal computer (PC) to view entertainment programming.

One problem associated with this is that consumers have become reliant on a plurality of communication and entertainment mechanisms and devices, which means when one is not readily available the consumer may experience frustration. To solve this issue, enterprises are converging voice and entertainment technologies, and making them ever present on a plurality of devices. For example, a cell phone can play streaming video and a PC can make voice calls to land lines or mobile phones, etc.

One area that has not been particularly integrated well is voice technology with television (TV) technology. Furthermore, when consumers are enjoying entertainment programming on TV and a desire for voice communications is needed, their viewing experience becomes disrupted and may never be re-established if the consumer has to track down a particular type of voice communication. It may also be that the particular type of voice communication is not available at all and the consumer is away from home entirely.

Thus, it is advantageous to provide techniques for more efficient voice and television integration.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of an embodiment of the present disclosure. It will be evident, however, to one skilled in the art that the present disclosure may be practiced without these specific details.

Figure 1:
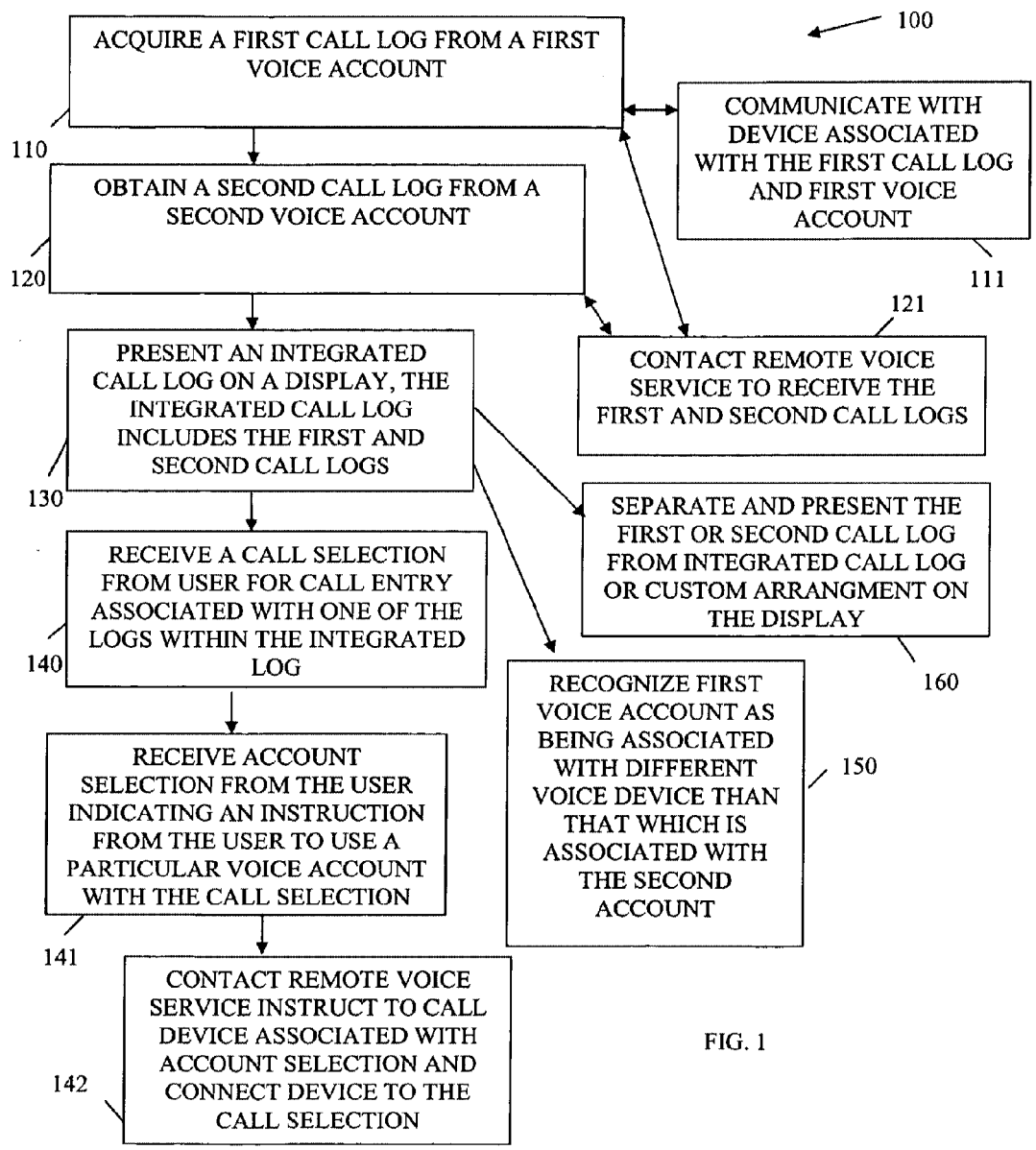
FIG. 1 is a diagram of a method for integrating voice during a television (TV) viewing experience from the perspective of a set-top box (STB), according to an example embodiment of the disclosure.

FIG. 1 is a diagram of a method 100 for integrating voice during a television (TV) viewing experience from the perspective of a set-top box (STB), according to an example embodiment of the disclosure. The method 100 (herein after referred to as "STB voice integration service") is implemented in a machine-accessible medium on a STB and is operational to communicate over one or more networks. The networks may be wired, wireless, or a combination of wired and wireless.

At 110, the STB voice integration service acquires a first call log from a first voice account. A call log is a call history associated with a voice calling account. The first voice account may be an account associated with a wireless phone service, landline or plain old telephone lines (POTS) service, voice over Internet Protocol (VoIP) service, etc.

A call log may also be associated with text messages, emails, voicemails, and/or instant messaging. Essentially, a call log may be viewed as a list or series of entries or metadata records, each entry or record may include one or more of the following: a calling number, email identification, instant message identification, text message user identification, date and time of call, duration of a call, indication of status or disposition of the call (e.g., was the call missed, answered forwarded, resulted in a voicemail, an email or text message), a customized icon or picture thumbnail representing an identity for a particular caller being identified in the entry, etc.

It is also understood that a call may be issuing a connection to contacting a voice communication device, transmitting an email, transmitting a text message, and/or establishing an instant message session. The call may also include a conference call between multiple voice communication devices or a joining or establishing a chat session.

According to an embodiment, at 111, the STB voice integration service may communicate with a device associated with the first call log and the first account. This device may be a cell phone, a satellite phone, a laptop, a personal computer (PC), a personal digital assistant (PDA), and the like. Communication can occur in a variety of manners, such as through a Bluetooth connection, a USB connection, or a home network or residential network to which both the STB voice integration service and the device are connected. If the device includes a service that supports communications unsolicited from the Internet, then the STB voice integration service may even go through the Internet to locate the device and communicate with it for purposes of acquiring the call log.

At 120, the STB voice integration service obtains a second call log from a second voice account. Again, this second call log is different from the first call log and is associated with a different voice account then the first voice account. It may be any type of voice account enumerated above. It may also be the case that the first voice account is one cell phone account and the second voice account is another cell phone account. So, although the two voice accounts are different and distinct from one another they may be of the same type; although they do not have to be; such as when the first account is a landline account and the second account is a cell phone account.

In an embodiment, at 121, it may be that the STB voice integration service contacts the remote voice service to receive the first and second call logs for the first and second voice accounts. The remote service maintains or is capable of obtaining one or both of the call logs from other services. For example it may be that a voice provider supplies access to a call log over an Internet World-Wide Web (WWW) site. The remote voice service may have the credential information for the user associated with the first and second accounts, such as identification and password. The remote service may then sign in as the user and scrape the call log from screens of the voice provider to acquire the call log. In other cases, it may be that an Application Programming Interface (API) for the voice provider may permit the remote voice service to directly interact with the features of the voice provider to acquire the call logs. In still more cases, it may be that the remote voice service is the voice provider for one or both of the voice accounts.

It may be that the STB voice integration service can interact with Internet WWW voice provider pages with proper initial identifications and passwords supplied during a setup or configuration process by the user. In these cases, the STB can acquire one or both of the call logs entirely independent from the remote service by signing in and scraping the WWW pages from the voice provider.

At 130, the STB voice integration service presents an integrated call log on a display to the user. The STB voice integration service processes on a STB and the STB is interfaced to the display, such as a TV or monitor. The call history or logs associated with both the first and second voice accounts are integrated as one and presented to the user on the display. The presentation may include information that permits the user to distinguish which call entry is associated with which voice account. This may be via effects, such as color, or may be via notations, such as icons, words, etc.

In some embodiments, at 140, the STB voice integration service may receive a call selection from the user for a particular call entry associated with one of the two call logs. The selection is made via an interface that the user activates, such as through a remote for the STB, where the user highlights or selects a particular call entry within the integrated call log.

It may even be the case, at 141 that the STB voice integration service receives an account selection from the user indicating an instruction from the user to use a particular voice account with the call selection made at 140. It may be the call selection made at 140 is from the first call log associated with the first voice account and the account selection made at 141 is for the second voice account. However, this does not have to be the case, so the account selection may also be for the first voice account when the call selection is for a call entry associated with the first call log.

It is noted, that the voice account selection does not have to occur at all. In other words, the user may have a default account selection and a default device associated with that default voice account.

The call selection may be sent from the STB to a remote service where it is processed in manners discussed below with respect to the method 200 of the FIG. 2. Additionally, the method 300 supplies a variety of alternative and enhanced processing that may be associated with the STB voice integration service.

At 142, the STB voice integration service contacts a remote voice service and instructs it to call a particular device associated with a default account or with a selected account made at 141. The remote voice service then calls that device and when that device is answered the call entry selected from the integrated call log at 140 is connected to the device. This entire process may be referred to as click to connect. Again, this click to connect or call may be a variety of things such as sending an email to a particular user, leaving or calling a voice mailbox, establishing an instant message session, sending a text message. In fact, the user may be provided an option as to who and what mechanism that the user wants to respond to a call log entry, such as reply via a live voice communication (landline, mobile, VoIP), leave a direct voice message to a voice mail box, send a text message, send an email, join or establish a conference call with others in addition to the caller, join or establish an instant message session, join or establish a chat session, etc. In this sense the phrase "click to connect" can also be viewed as "click to call" or even "click to reply."

According to an embodiment, at 150, the STB voice integration service may recognize that the first voice account is associated with a different voice device than that which is associated with the second account. So, the STB voice integration service may maintain mappings for devices of the user based on the voice account of the user. A single voice account may also have a plurality of devices, such as when that voice account is a VoIP account.

In some cases, the user may request that the integrated call log be presented in some subset or custom manner. For example, the user may desire to see call log entries for just the first call log or just the second call log. The user may also desire to see selective entries that may span both the first and second call log and appear in the integrated call log, such as just calls from "Jeff" or just calls from number, email, or user id "X" and the like. So the user may create or request custom presentations from the integrated call log.

Figure 2:
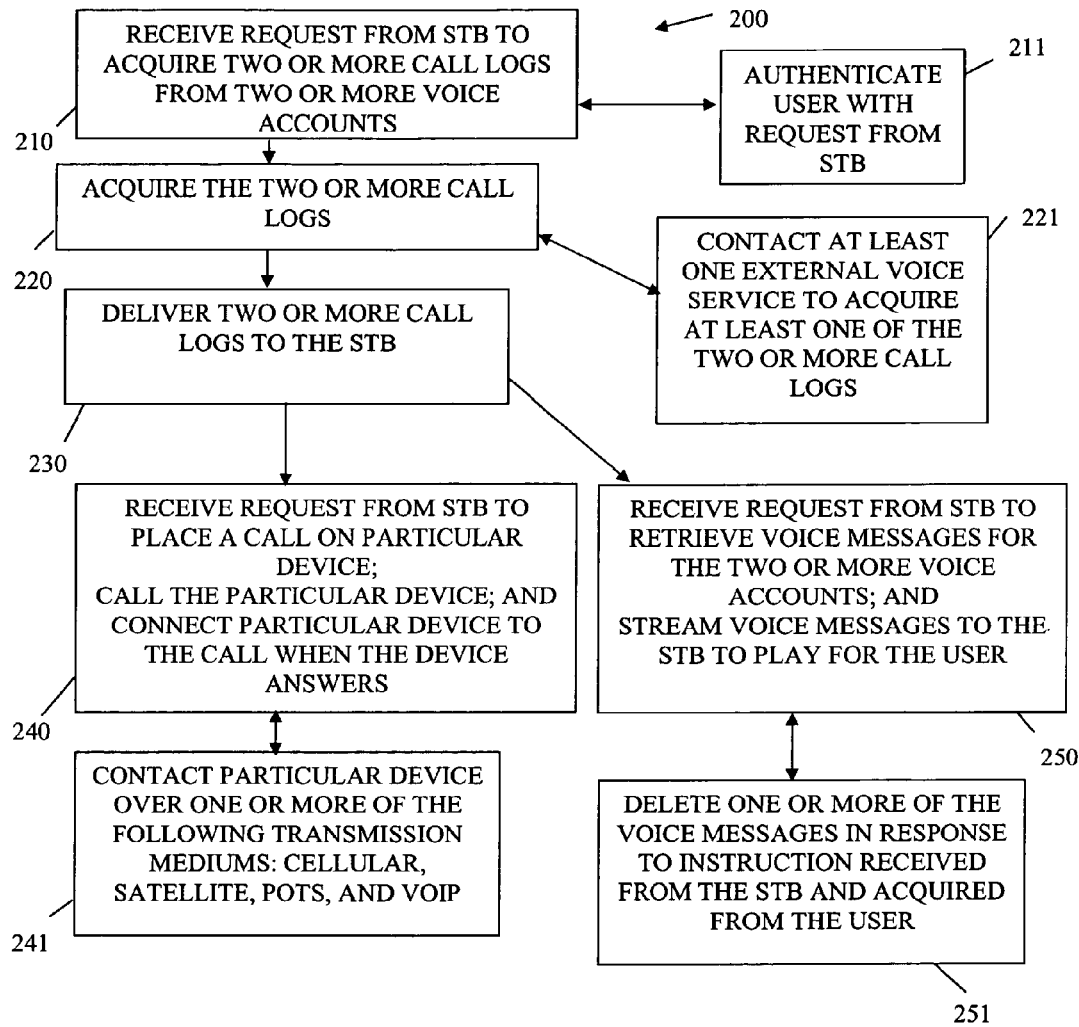
FIG. 2 is a diagram of a method for integrating voice during a TV viewing experience from the perspective of a remote service interacting with the STB, according to an example embodiment of the disclosure.

FIG. 2 is a diagram of a method 200 for integrating voice during a TV viewing experience from the perspective of a remote service interacting with the STB, according to an example embodiment of the disclosure. The method 200 (hereinafter referred to as "remote voice integration service") is implemented in a machine-accessible and readable medium and is operational over a network. The network may be wired, wireless, or a combination of wired and wireless. The remote voice integration service interacts with the STB voice integration service represented by the method 100 of the FIG. 1.

At 210, the remote voice integration service receives a request from a STB to acquire two or more call logs from two or more voice accounts. The request may actually be received from the STB voice integration service discussed above with reference to the method 100 of the FIG. 1.

In some cases, at 211, the request may include a variety of information that permits the remote voice integration service to authenticate the STB and the user associated with the request. Any authentication technique may be used to establish that the request is legitimate and is being received from the STB and if desired to properly ensure that it is specifically the user associated with the voice accounts making or initiating the request on the STB.

At 220, the remote voice integration service acquires the call logs. This can occur in a variety of ways. For example, at 221, the remote voice integration service may contact at least one external service, such as voice provider WWW service, to acquire at least one of the call logs. In some cases, the remote voice integration service may directly maintain or be associated with one or more of the voice accounts such that the information is locally available or easily acquired by the remote voice integration service.

At 230, the remote voice integration service delivers the two or more call logs to the STB in response to the initial request for the same. The two or more call logs are then integrated on the STB in the manners discussed above with the STB voice integration service represented by the method 100 of the FIG. 1. In some cases, the remote voice integration service may itself perform the integration on the two or more call logs and deliver them as one single integrated stream of information.

According to an embodiment, at 240, the remote voice integration service may receive another request from the STB to place a call on a particular device. In response to this, the remote voice integration service calls the particular device and connects the call to the particular device when the device is answered. So, the user interacting with the STB can place a call via the TV monitor by interacting with novel processing associated with the STB and the remote voice integration service, where the call is made and transferred to the user in the manner discussed above. The particular call is selected by the user from the integrated call log.

In some cases, at 241, the remote voice integration service may contact the particular device of the user over a variety of transmission mediums such as, but not limited to, cellular, satellite, POTS, and/or VoIP.

At 250, the remote voice integration service may also receive a request from the STB to retrieve voice messages associated with both or one of the two or more voice accounts. The voice messages may then be streamed to the STB and played for the user on an audio device interfaced to the STB.

At 251, the remote voice integration service may then delete one or more of the voice messages in response to instruction received from the STB and acquired from the user. So, the user may determine that the message can be deleted and the STB communicates that to the remote voice integration service. The remote voice integration service then contacts the voice mail box for the proper voice account and deletes the message on behalf of the user. So, not only may the call logs be integrated and managed but the voice mail boxes of multiple voice accounts may be managed in an integrated and convenient manner via the interaction between the STB and the remote voice integration service.

Figure 3:
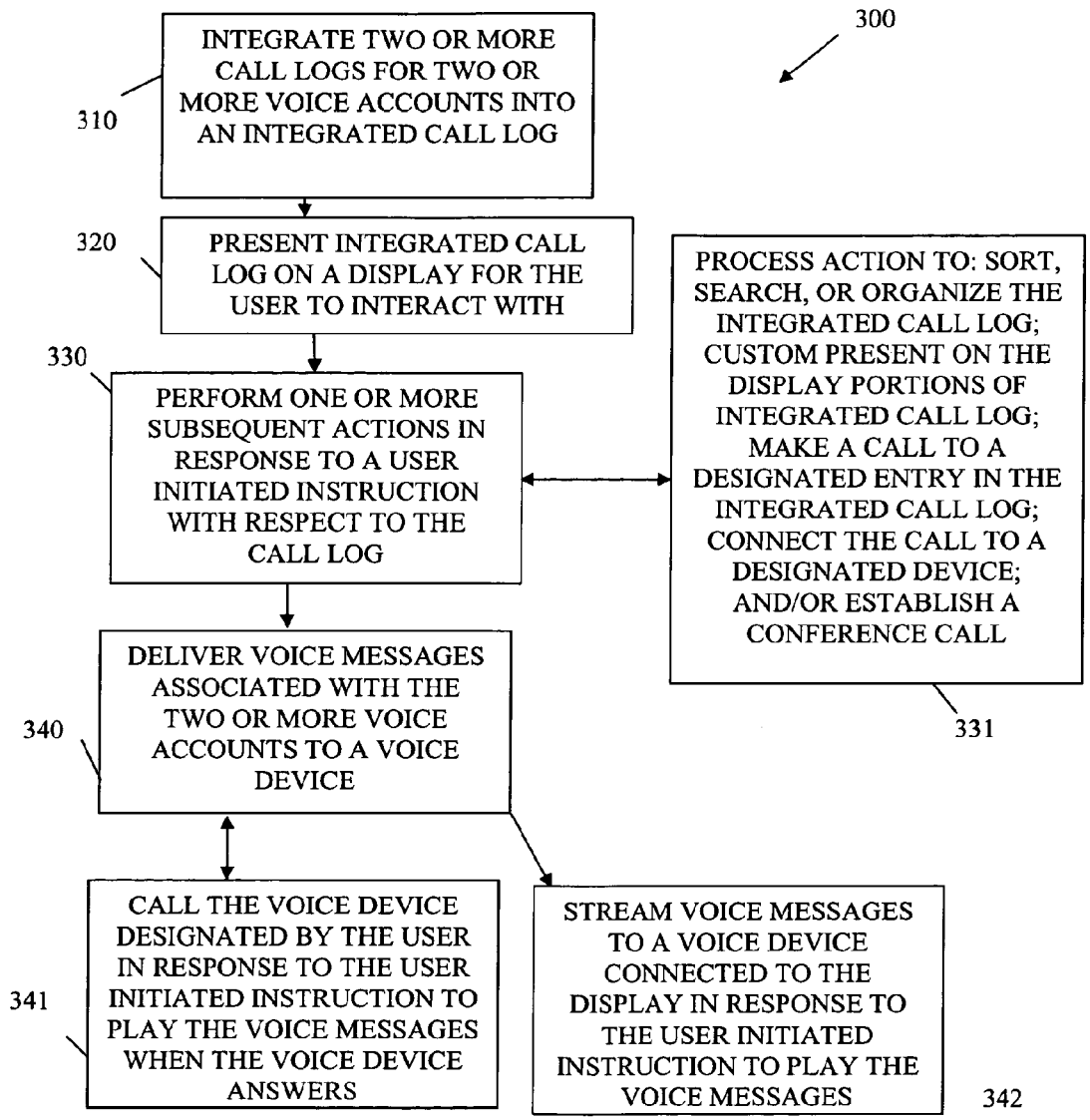
FIG. 3 is a diagram of another method for integrating voice during a TV viewing experience from the perspective of a STB, according to an example embodiment of the disclosure.

FIG. 3 is a diagram of another method 300 for integrating voice during a TV viewing experience from the perspective of a STB, according to an example embodiment of the disclosure. The method 300 is implemented as instructions within a machine-accessible and readable medium and is operational over one or more networks. The networks may be wired, wireless, or a combination of wired and wireless. The instructions when executed by a machine represents an alternative processing perspective or an enhanced processing perspective to the STB voice integration service represented by the method 100 of the FIG. 1 and interacts with the remote voice integration service represented by the method 200 of the FIG. 2.

The instructions may be implemented on a removable medium and subsequently interfaced to a machine where the instructions are uploaded within the machine and processed. Alternatively, the instructions may be prefabricated within memory or storage of the machine and loaded for execution when the machine is initiated or booted. In still another arrangement, the instructions may be downloaded from a network storage location or other network machine to a target machine on the network and processed. In yet another situation, the instructions may be remotely processed over a network on one machine at the instruction and on behalf of another different network machine.

In an embodiment, the instructions reside and processing within a STB interface to one or more TV's having one or more displays.

At 310, the instructions integrate two or more call logs for two or more voice accounts associated with a user into an integrated call log. Examples of these were provided in detail above with respect to the STB voice integration service represented by the method 100 of the FIG. 1 and the remote voice integration service represented by the method 200 of the FIG. 2.

At 320, the instructions present the integrated call log on a display for the user to interact with. At 330, the instructions perform one or more subsequent user initiated instructions with respect to the entire call log as a whole or with respect to one or selective ones of call entries associated with the integrated call log.

In an embodiment, at 331, the instructions can perform a variety of actions such as, but not limited to, sorting the integrated call log; searching the integrated call log; organizing the integrated call log; custom presenting selective portions of the integrated call log on the display; making a call to a designated entry in the integrated call log (via a click to connect); connecting the call to the designated device; and/or establishing a conference call between two or more call entries in the integrated call log.

In an embodiment, at 340, the instructions may deliver voice messages associated with the two or more voice accounts to a voice device. In some situations, at 341, this may entail calling the voice device designated by the user in response to the user initiated instruction to play the voice messages when the voice device answers. In other cases, at 342, this may entail streaming voice messages to a voice device connected to the display in response to the user initiated instruction to play the voice messages.

The instructions may perform other operations on behalf of the user as well, such as providing an up-to-date summary by voice account of minutes used, minutes free, minutes over the limit Voice providers supply this information via the WWW, in most situations, so acquiring it and presenting it in a summary manner with the integrated call log or accessible from options associated with the integrated call log is easily achieved.

Additionally, the sorting of the integrated call log may be done by name, by number, by date, by time, by voice account. Options may also permit the instructions to dynamically refresh the integrated call log. Users may even assign categories to certain call entries and sort or search by these categories, such as over minutes for the month, mom's number, etc.

Figure 4:
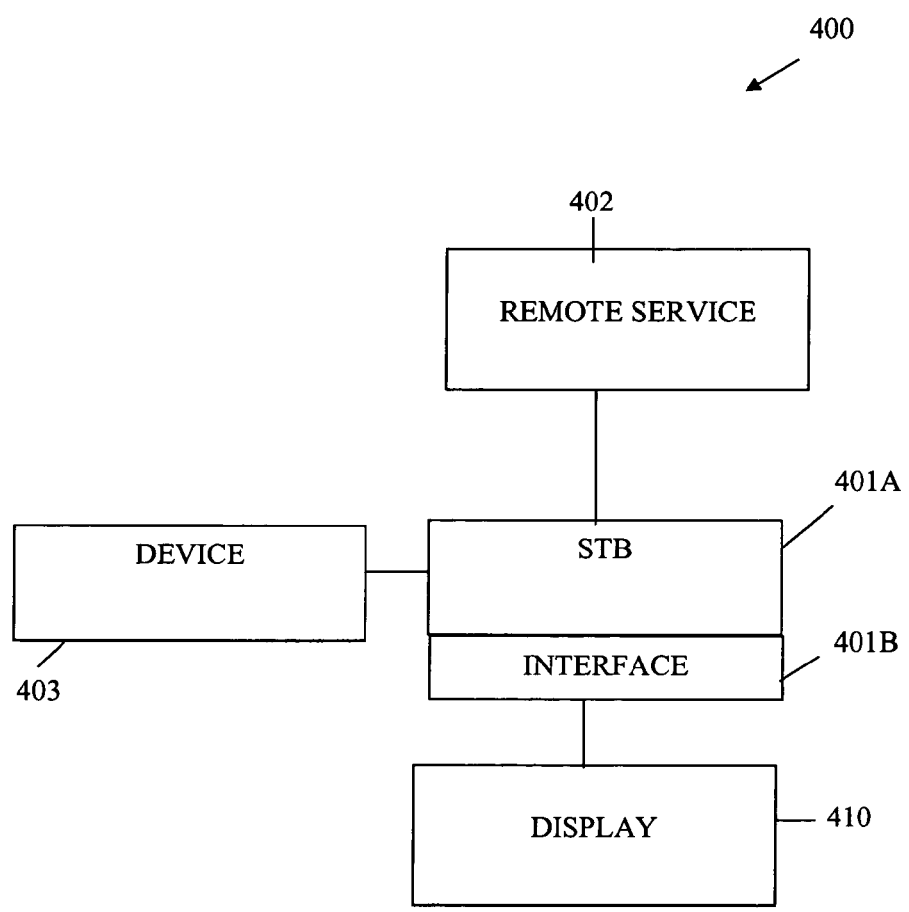
FIG. 4 is diagram of voice and TV integration system, according to an example embodiment of the disclosure.

FIG. 4 is diagram of voice and TV integration system 400, according to an example embodiment of the disclosure. The voice and TV integration system 400 is implemented within a machine readable medium and on a STB interfaced to displays associated with at TV. In some cases, the voice and TV integration system 400 may have some components implemented on other machines, such as remote servers. The voice and TV integration system 400 implements, among other things, the processing associated with the methods 100, 200, and 300 of the FIGS. 1-3, respectively.

The voice and TV integration system 400 includes a STB 401A. In an embodiment, the voice and TV integration system 400 may also include a remote service 402. Each of these components and their interactions with one another will now be discussed in turn.

The STB 401A includes an interface 401B. The processing associated with the STB 401A was described in detail above with respect to the methods 100 and 300 of the FIGS. 1 and 3. The interface 401B permits the STB 401A to interact with a user and communicate with the user via presentations made on a display 410, such as TV or monitor.

The STB 401A integrates multiple call logs for multiple voice accounts into an integrated call log. The integrated call log is then presented to the user via the display 410. The user then interacts with the integrated call log to perform a variety of operations or actions via the interface 401B. Such action may include, but are not limited to, sorting the integrated call log; searching the integrated call log; custom organizing the integrated call log; enlisting the assistance of a remote service to assist in establishing calls or retrieving voice mail messages associated with the multiple voice accounts; establishing conferences calls; and/or communicating with a designated device 403 to retrieve one or more of the multiple call logs or to place a particular call.

In an embodiment, the STB 401A is an Internet Protocol (IP) TV (IPTV) enabled STB 401A. The STB 401A interacts with devices and services via the Internet using IP communications and services to assist in integrating the call logs, initiating calls, and retrieving and managing voice mail messages.

In some cases, it may be that the STB 401A that is IP enabled includes a microphone of a Bluetooth capability with a voice device 403. In such a situation, calls can be made via the STB 401A using VoIP and a VoIP account. So, a user can do a click to call via the integrated call log and then actually conduct the call, or even conference call in front of the TV and the STB.

The voice and TV integration system 400 may also include a remote service 402 located remotely over the Internet from the environment of the STB 401A and the user interacting with the STB 401A. The remote service 402 interacts or assists the STB 401A in acquiring all or some of the multiple call logs. In fact, in some cases, the remote service 402 may deliver the integrated call log itself as a single entity to the STB 401A. The remote service 402 may also assist in completing some of the actions selected or made by the user via the interface 401B of the STB 401A. Some of this assistance in completing the actions may include, but is not limited to, retrieving voice messages, delivering voice messages to a particular device 403, delivering voice messages to a device associated with the display 410, establishing a conference call for the user from multiple selections of entries in the integrated call log, establishing a call to a particular call entry selected by the user from the integrated call log, etc.

Figure 5:
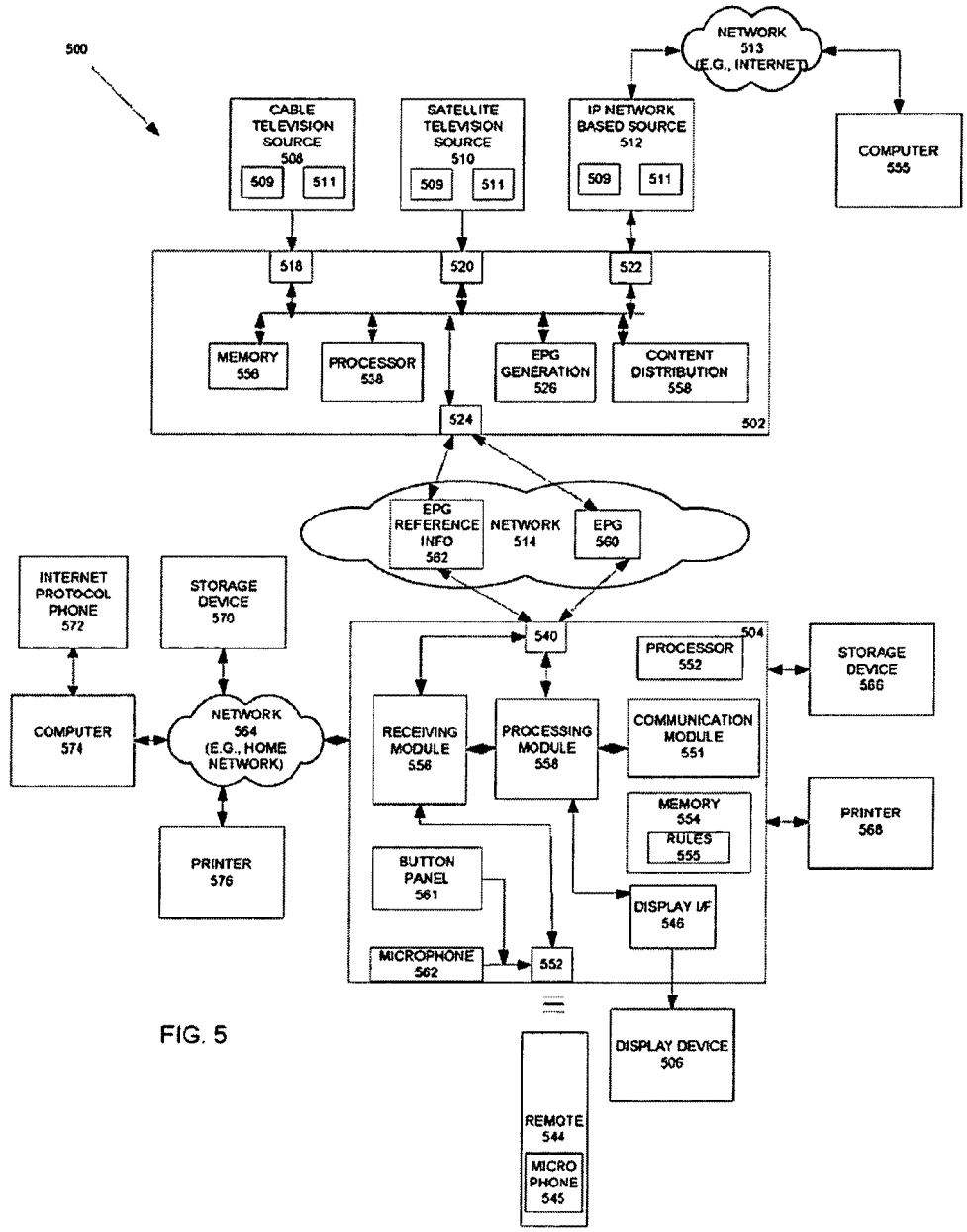
FIG. 5 is a diagram of an example network architecture for devices, machines, services, systems, and instructions to interact and perform any one or more of the methodologies discussed herein, according to an example embodiment of the disclosure.
Figure 6:
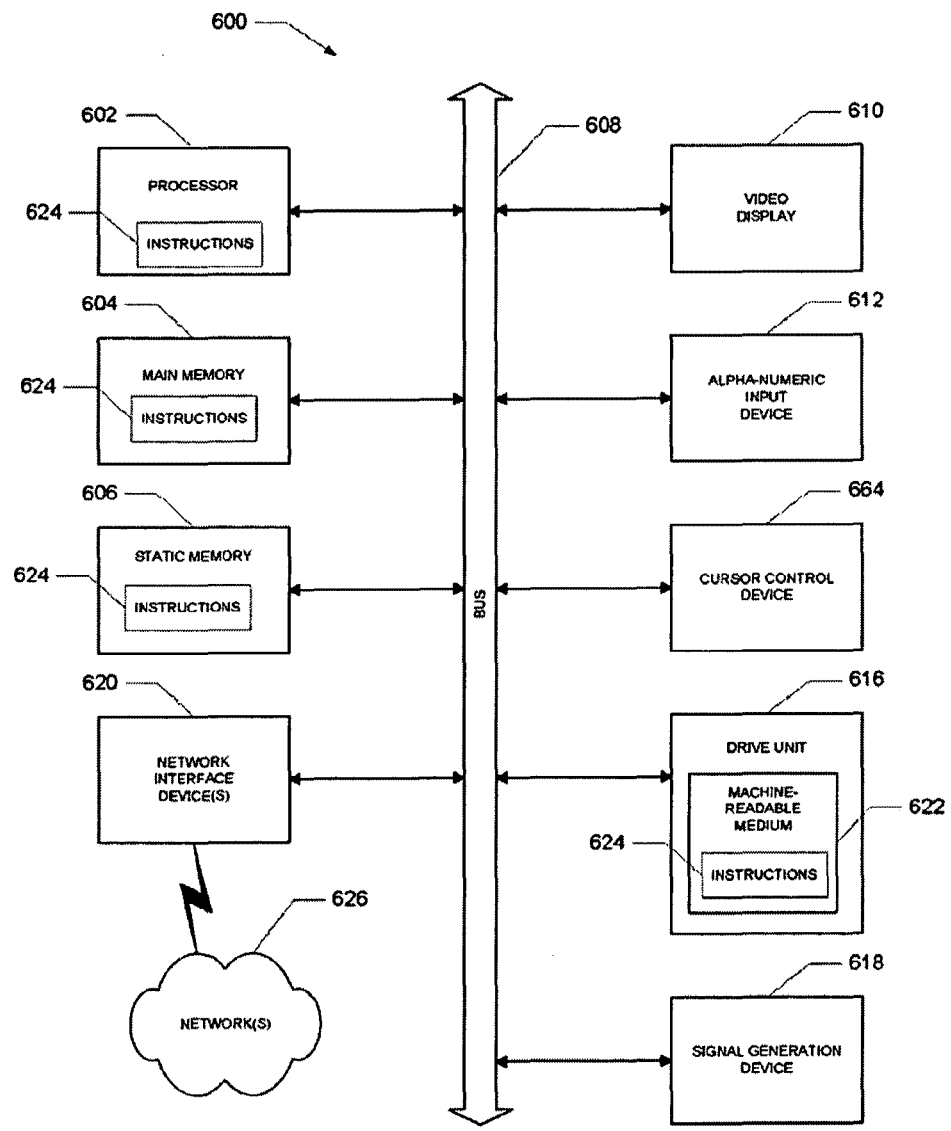
FIG. 6 is a diagram of an example machine architecture within which a set of instructions for causing the machine to perform any one or more of the methodologies discussed herein may be executed, according to an example embodiment of the disclosure.

FIGS. 5-6 are now presented for purposes of providing an example network architecture and machine architecture for which devices can interact to achieve the teachings and techniques presented herein. This layout and configuration is presented for purposes of illustration only and is not intended to limit the embodiments presented herein.

FIG. 5 is a diagram of an example network architecture 500 for devices, machines, services, systems, and instructions to interact and perform any one or more of the methodologies discussed herein, according to an example embodiment of the disclosure.

FIG. 5 may also be viewed as an example multimedia distribution system 500 that is implemented in accordance with at least one embodiment of the present disclosure. As shown, the system 500 includes a multimedia content provider 502, a set-top box 504, a display device 506, a plurality of multimedia content sources, such as cable television source 508, satellite television source 510, and IP network-based source 512.

In the illustrated embodiment, the content provider 502 and the set-top box 504 are connected via a network 514, where the network 514 can include a cable television distribution network, a satellite distribution network, a broadcast television distribution network, a data packet-based computer network (e.g., an Ethernet network), and the like. Likewise, the content sources 508, 510, and 512 may be connected via one or more networks to the content provider 502.

As shown, the content provider 502 can include one or more interfaces 518, 520, and 522 to interface with the content sources 508, 510, and 512, respectively, and an interface 524 to interface with the set-top box 504 via the network 514. The interfaces 518, 520, 522, and 524 may include any of a variety of local network interfaces, such as a coaxial cable interface, an Ethernet, and a HPNA. The IP Network based source 512 is shown to be connected to a computer 515 over a network 513 (e.g., Internet) thereby providing a communication path between a user operating the set-top box 504 and a user operating the computer 515. The content provider 502 further may include an EPG generation module 526 and a multimedia content distribution module 528. The modules 526 and 528 may be implemented as software, hardware, firmware, or combinations thereof. To illustrate, the content provider 502 may include a memory 536 (e.g., static random access memory (SRAM)) and one or more processors 538, where the modules 526 and 528 may be implemented in part or in whole as executable instructions stored in the memory 536 and executed by the processor 538 to perform the techniques described herein.

As also shown, the set-top box 504 may include an interface 540 for interfacing with the content provider 502 via the network 514, a control interface 542 to receive user input and commands, (e.g., via a remote control 544, a button panel 561, a microphone 562) and a display interface 546 to interface with the display device 506. The interface 540 may include any of a variety of appropriate interfaces, such as a coaxial cable interface, a wireless interface to send and receive wireless transmissions, or a data packet-based network interface, such as an Ethernet interface. The control interface 542 may include any of a variety of interfaces, such as an infrared interface, a wireless interface, or the button panel 561. The remote control 544 is shown to include a microphone 545 for receiving voice commands and the set-top box 504 is also shown to include a microphone 562 for receiving voice commands.

The set-top box 504 is further shown to be connected to or to have an integrated storage device 566 (e.g., DVR, hard disk, compact disk, floppy, universal serial bus key, etc.) for storing files, a printer 568 for printing files, and a network 564 (e.g., home network). The network 564, in one embodiment, may connect the set-top box 504 to a computer 574 that is connected to an internet protocol phone 572, a storage device 570 for storing electronic files, and a printer 576. The set-top box 504 further may include a processing module 558, a receiving module 556, and a communication module 551. The processing module 558, receiving module 556, and communication module 551 may be implemented as hardware, software, firmware, or combinations thereof. To illustrate, the set-top box 504 may include a memory 554 and one or more processors 552, where one or both of modules 548 and 550 are implemented as executable instructions stored in memory 554 and executed by the processor 552 to implement techniques described herein. The memory is further shown to include rules 555 that may be utilized to control the use of images that may be captured from content that is displayed on the display device 506. For example the rules 555 may embodied as a digital rights management license that may be distributed with content from the content source 508, 510, and 512. As is well known in the art, the license may include rules 555 that may restrict the use of the associated content.

In a particular embodiment, the content provider 502 receives data representative of multimedia channels from each of the different content sources 508, 510, and 512, and provides data representative of at least a subset of the multimedia channels to the set-top box 504 for processing and display at the display device 506 and/or output via an audio device (not shown). In one embodiment, the content provider may include a content module 509 that communicates data that includes content and a control module 511 that may communicate data that includes control information (e.g., digital license) that may include a rule that restricts the use of associated content. Moreover, in a particular embodiment, the content provider 502 may provide data representative of an electronic programming guide (EPG) 560 to the set-top box 504 for processing by the processing module 558 and for navigation by a user via the control interface 542 and the processing module 558. As described herein, the EPG 560, in one embodiment, represents a unified EPG including listings for the multimedia channels provided by two or more content sources that provide multimedia channels to the content provider 502. To illustrate, in a particular embodiment, the EPG 560 represents a navigable program guide or user interface whereby a user, via the remote control 544 or other input device, can direct the processing module 550 to navigate between multimedia channels by selecting an icon or other graphical representation of the desired channel as represented by a graphical display of the EPG 560. The EPG 560 may combine representations of all of the multimedia channels from different content sources in a single list or different lists for different content sources may be displayed concurrently by the EPG 560. Moreover, multimedia channels may be organized within the EPG 560 based on any of a variety of characteristics, such as by the program content of the multimedia channels, where the program content describes the genre or categorization of the video/audio program represented by the multimedia channel. Examples of various genres or categories include a "comedy" genre, an "action" genre, a "family" genre or "children" genre, a "romance" genre, a "science-fiction" genre, and the like.

FIG. 6 is a diagram of an example machine architecture within which a set of instructions for causing the machine to perform any one or more of the methodologies discussed herein may be executed, according to an example embodiment of the disclosure.

Accordingly, FIG. 6 shows a diagrammatic representation of machine in the example form of a computer system 600 within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, and optical and magnetic media.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to allow a reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed is:

1. A method, comprising:
obtaining, by a set-top box comprising a processor, a first call log from a first voice account in response to a first request to acquire call logs from a plurality of voice accounts;
obtaining, by the set-top box, a second call log from a second voice account in response to the first request;
integrating, by the set-top box, the first call log of the first voice account and the second call log of the second voice account into an integrated call log, wherein the first voice account is associated with a first type of voice device and the second voice account is associated with a second type of voice device;
presenting, by the set-top box, the integrated call log on a display; and
initiating, by the set-top box, a call based on a call entry selected from the integrated call log by sending a second request to a remote voice integration service, wherein the remote voice integration service selects a first device of the first type of voice device to initiate the call with a second device of the second type of voice device, and wherein the first device comprises the set-top box and the second device comprises a mobile phone.

2. The method of claim 1, wherein the first voice account is associated with a different voice device from that associated with the second voice account.

3. The method of claim 1, further comprising receiving an account selection in connection with the call entry indicating an instruction to use the first voice account or the second voice account.

4. The method of claim 1, wherein the second device is associated with the call entry.

5. The method of claim 1, further comprising selecting the remote voice integration service to initiate the call responsive to recognizing the first voice account is associated with a different voice device than that which is associated with the second voice account.

6. The method of claim 1, wherein the first call log for the first voice account and the second call log for the second voice account are obtained from the remote voice integration service.

7. The method of claim 1, wherein obtaining the first call log further comprises communicating with a device associated with the first voice account to obtain the first call log associated with the first voice account.

8. The method of claim 1, wherein the integrated call log is presented with icons to distinguish call entries for different voice accounts including the first voice account and the second voice account.

9. A method, comprising:
receiving, by a first communication device comprising a processor, a request to acquire a plurality of call logs of a corresponding plurality of voice accounts;
obtaining, by the first communication device, the plurality of call logs of the corresponding plurality of voice accounts;
generating, by the first communication device, an integrated call log based on combination of the plurality of call logs;
receiving, by the first communication device, a selection of a call entry from the integrated call log;
initiating, by the first communication device, a call to a second communication device associated with the call entry, wherein the first communication device comprises a first type of voice device, wherein the second communication device comprises a second type of voice device, and wherein the first type of voice device differs from the second type of voice device; and
initiating, by the first communication device, communications with the second communication responsive to the second communication device answering the call.

10. The method of claim 9, wherein the plurality of call logs is obtained from a plurality of communication devices.

11. The method of claim 10, further comprising supplying authentication information to the plurality of communication devices to obtain the plurality of call logs from the plurality of communication devices.

12. The method of claim 9, wherein the first communication device comprises a set-top box, and wherein the second communication device comprises a mobile communication device.

13. The method of claim 9, wherein the call is initiated over one of cellular communication system, a satellite communication system, a wireline communication system, or any combination thereof.

14. The method of claim 9, further comprising receiving a second request to retrieve voice messages associated with the plurality of voice accounts.

15. The method of claim 14 further comprising deleting one of the voice messages in response to receiving an instruction.

16. A machine-readable storage device comprising instructions which, responsive to being executed by a processor, cause the processor to perform operations comprising:
combining a plurality of call logs associated with a plurality of voice accounts of different devices into an integrated call log;
presenting the integrated call log on a display in a manner that distinguishes each call log entry according to the different devices;
receiving a selection of a call log entry of the integrated call log; and
initiating a call from a first communication device to a second communication device associated with the call log entry, wherein the first communication device comprises a first type of communication device, wherein the second communication device comprises a second type of communication device, and wherein the first type of communication device differs from the second type of communication device.

17. The machine-readable storage device of claim 16, wherein the plurality of call logs is obtained from a plurality of communication devices.

18. The machine-readable storage device of claim 17, wherein the first communication device and the second communication device are included in the plurality of communication devices, and wherein the processor comprises a plurality of processors operating in a distributed processing environment.

19. The machine-readable storage device of claim 17, wherein the operations further comprise supplying authentication information to the plurality of communication devices to obtain the plurality of call logs from the plurality of communication devices.

20. The machine-readable storage device of claim 16, wherein the integrated call log is presented with icons to distinguish call log entries of the first communication device from call log entries of the second communication device.

* * * * *